J. H. DEPPELER.
METHOD OF PRODUCING ALUMINOTHERMIC MIXTURES.
APPLICATION FILED SEPT. 8, 1915.
1,168,061.
Patented Jan. 11, 1916.
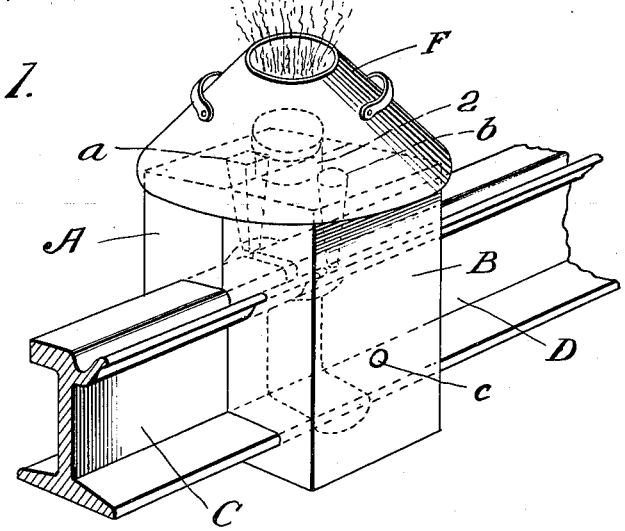
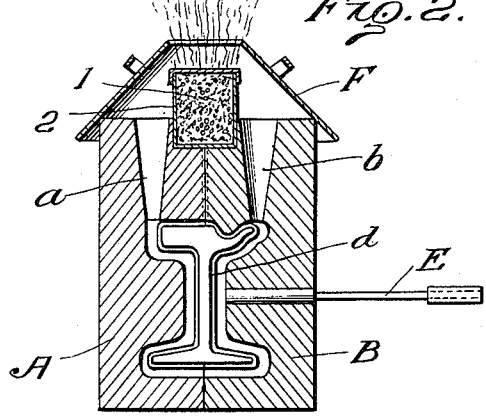
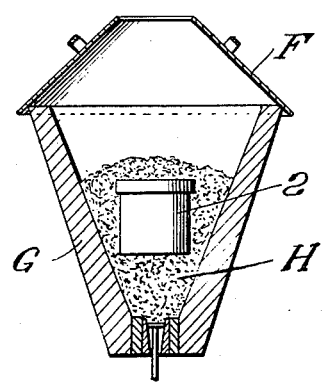
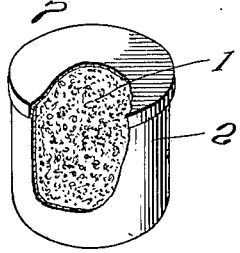
Inventor
Attorney

UNITED STATES PATENT OFFICE.

JOHN H. DEPPELER, OF JERSEY CITY, NEW JERSEY, ASSIGNOR TO GOLDSCHMIDT THERMIT COMPANY, OF NEW YORK, N. Y., A CORPORATION OF NEW YORK.

METHOD OF PRODUCING ALUMINOTHERMIC MIXTURES.

1,168,061.  Specification of Letters Patent.  Patented Jan. 11, 1916.

Application filed September 8, 1915. Serial No. 49,469.

*To all whom it may concern:*

Be it known that I, JOHN H. DEPPELER, a citizen of the United States, and resident of Jersey City, in the county of Hudson and State of New Jersey, have invented certain new and useful Methods of Producing Aluminothermic Mixtures, of which the following is a specification.

This invention relates to the method of producing alumino-thermic mixture for use in welding by the "thermit" process. It is customary to mix with the fundamental constituents of the alumino-thermic mixture, to wit, aluminum and an oxid, one or more additional constituents, such as metallic particles, or perhaps other oxids and aluminum to alter the composition of the resulting metal and to "temper" the reaction of the oxid and aluminum. It has been common practice to mix these additional constituents with the oxid and aluminum in the crucible, such additions being made up to 15% or 20% of the weight of the oxid and aluminum in the charge. The addition to the aluminum and oxid not only controls the composition of the resulting metal, but also effects a saving of approximately twice its weight of "thermit," because "thermit" produces only about half its weight in metal.

One of the disadvantages of the above procedure is that some of the heat of the "thermit" is required to heat and melt the additional constituents, and, therefore, the additional constituents cannot be used in greater quantity than 15% or 20% of the weight of the oxid and aluminum without so reducing the temperature of the resulting metal as to make it unsuited for welding purposes. Furthermore, certain additions, such as manganese, which are easily oxidized, may act on a small scale like the aluminum, reducing oxid, and thus leaving an excess of aluminum in the resulting metal and causing the composition of the resulting metal to be not so perfectly under the control of the operator.

To overcome all of the above-noted objections and to effect a considerable saving in the quantity of "thermit" necessary by rendering it possible to gain a much greater advantage from the amount of metallic particles used, it is proposed, according to the present improved method, to keep the additional constituents separate from the aluminum and oxid until after the molten metal begins to form and to preheat the additional constituents before they are mixed with the oxid and aluminum. This is accomplished in the preferred form of the method by placing the additional constituent or constituents in a sheet-metal container and preheating the container and its contents before it is placed in the mixture of aluminum and oxid. This preheating may be done during the preheating of the welding mold, the waste heat from such preheating operation being utilized to heat the container and contents. The container with its contents heated in this manner, preferably to red heat, is then placed in the crucible and embedded in the aluminum and oxid mixture. The container is made of fusible material, and when the reaction takes place in the crucible and the temperature reaches the necessary degree, the container will melt, allowing the preheated additional constituents to mix with the molten metal. The additions are, therefore, kept separate from the oxid and aluminum until the molten metal begins to form, and as they have been preheated, only a relatively small heat is required to melt them. A much greater quantity of additional constituents can, therefore, be used than has heretofore been possible without reducing the temperature of the "thermit" to such a degree as to affect its welding ability. It has been found in practice that from 30% to 40% of additional constituents may be used and still leave a sufficiently high temperature in the resulting metal for the welding operation. In fact, the use of 30% to 40% of additional constituents heated according to the present method, will result in the formation of metal at approximately the same temperature as the use of 15% to 20% of additional constituents not preheated, but merely mixed with the "thermit." It is obvious that the more additional constituents used, the greater will be the saving of the "thermit." Since the ultimate object of the method is to produce a certain amount of metal at a certain temperature, it is obvious that the present method allows this production at a greatly decreased cost on account of the relatively small quantity of "thermit" used.

In order to give a clear understanding of the improved method, reference is made to the accompanying drawing, in which:—

Figure 1 is a perspective view of a mold applied to the ends of two railway rails, the container above referred to being shown in position on top of the mold for preheating during the preheating of the mold; Fig. 2 is a transverse section taken through the center of the mold shown in Fig. 1; Fig. 3 is a vertical section of the crucible showing the container with its additional constituents embedded in the aluminum and oxid; and Fig. 4 is a broken perspective view of the container showing the additional constituents therein.

In the drawing, the two parts of the mold A and B are shown applied to the rail sections C and D, in the usual manner. The mold sections are provided with the usual sprue openings $a$ and $b$ and the customary preheating opening $c$, all communicating with the interior of the mold.

It is customary, after applying the luting strips $d$, referred to in my co-pending application, Ser. No. 49,470 filed of even date herewith, to apply the mold sections A and B to the rail ends, as shown in Figs. 1 and 2, and then to preheat the mold sections and the rail ends by means of a preheating torch E. The flames and gases, after circulating through the interior of the mold, arise through the sprue openings $a$ and $b$. This fact is taken advantage of in preheating the additional constituent or constituents by placing the same on top of the mold during the preheating operation, so as to be heated by the hot gases arising from the sprue openings in the mold. As above stated, the one or more additional constituents 1 are preferably placed in a metallic fusible container 2 and the container placed on top of the mold, as clearly shown in Figs. 1 and 2. A crucible top F may be placed over the mold to assist in confining the hot gases escaping from the sprue openings and to deflect the same against the container, this facilitating the heating of the same.

The container and its contents are heated to substantially red heat by the preheating operation and the container is then placed in the reaction crucible G, Fig. 3, and embedded in the mixture of aluminum and oxid, indicated at H. When the reaction takes place and the molten metal begins to form, the metal of the container 2 melts and allows the one or more additional constituents in the container to mix with the molten metal in the crucible and the entire mixture passes from the crucible into the mold, it being understood that the crucible is properly positioned over the mold to discharge its contents into the interior of the mold.

The metal of the container 2 should be of such character as not to detrimentally affect the composition of the mixture, or else it should be of such character that it will float upon the surface of the molten metal. It will, therefore, be seen that when the method is carried out, as indicated in the accompanying drawing, the one or more additional constituents are preheated and kept separate from the oxid and aluminum until after the molten metal begins to form, the metal of the container acting as a separator for this purpose.

It is obvious that the container and its contents may be preheated in any suitable manner, that set forth being merely exemplary. Furthermore, numerous changes may be made in the process as above described without departing from the spirit or scope of the invention, as defined in the accompanying claims.

What I claim is:—

1. The improvement in the art of producing alumino-thermic mixture from aluminum, an oxid, and an additional constituent to be used in preheated molds for welding and other purposes, which consists in preheating the additional constituent during the preheating of the mold and placing the same in an unmelted state in the aluminum and oxid, the heat of the reaction serving to melt the additional constituent.

2. The improvement in the art of producing alumino-thermic mixture from aluminum, an oxid, and an additional constituent, which consists in placing the additional constituent in sufficiently close relation with the aluminum and oxid to cause the heat of the reaction to melt the additional constituent, said additional constituent being kept separate from the aluminum and oxid until the molten metal begins to form.

3. The improvement in the art of producing alumino-thermic mixture from aluminum, an oxid, and an additional constituent, which consists in placing the additional constituent in a sheet-metal container and placing the container and its contents in the mixture of aluminum and oxid.

4. The improvement in the art of producing alumino-thermic mixture from aluminum, an oxid, and an additional constituent, to be used in preheated molds for welding and similar operations, which consists in placing the additional constituent in a fusible container, preheating the container and its contents during the preheating of the mold, and then placing the container and its contents in the mixture of aluminum and oxid.

5. The improvement in the art of producing alumino-thermic mixture from aluminum, an oxid, and an additional constituent, which consists in placing the additional constituent in a fusible container, preheating the container and its contents and then placing the same in the mixture of aluminum and oxid.

6. The improvement in the art of producing alumino-thermic mixture from aluminum, an oxid, and an additional constituent to be used in preheated molds for welding and other purposes, which consists in preheating the additional constituent during the preheating of the mold and placing the same in the aluminum and oxid.

Signed at Jersey City in the county of Hudson and State of New Jersey this 13th day of August A. D. 1915.

JOHN H. DEPPELER.

Witnesses:
FRANK E. OLDER,
WALTER J. SWEENEY.